No. 644,338. Patented Feb. 27, 1900.
S. A. SLAUSON.
COUPLING FOR HAY LOADERS.
(Application filed Oct. 7, 1899.)
(No Model.) 2 Sheets—Sheet 1.
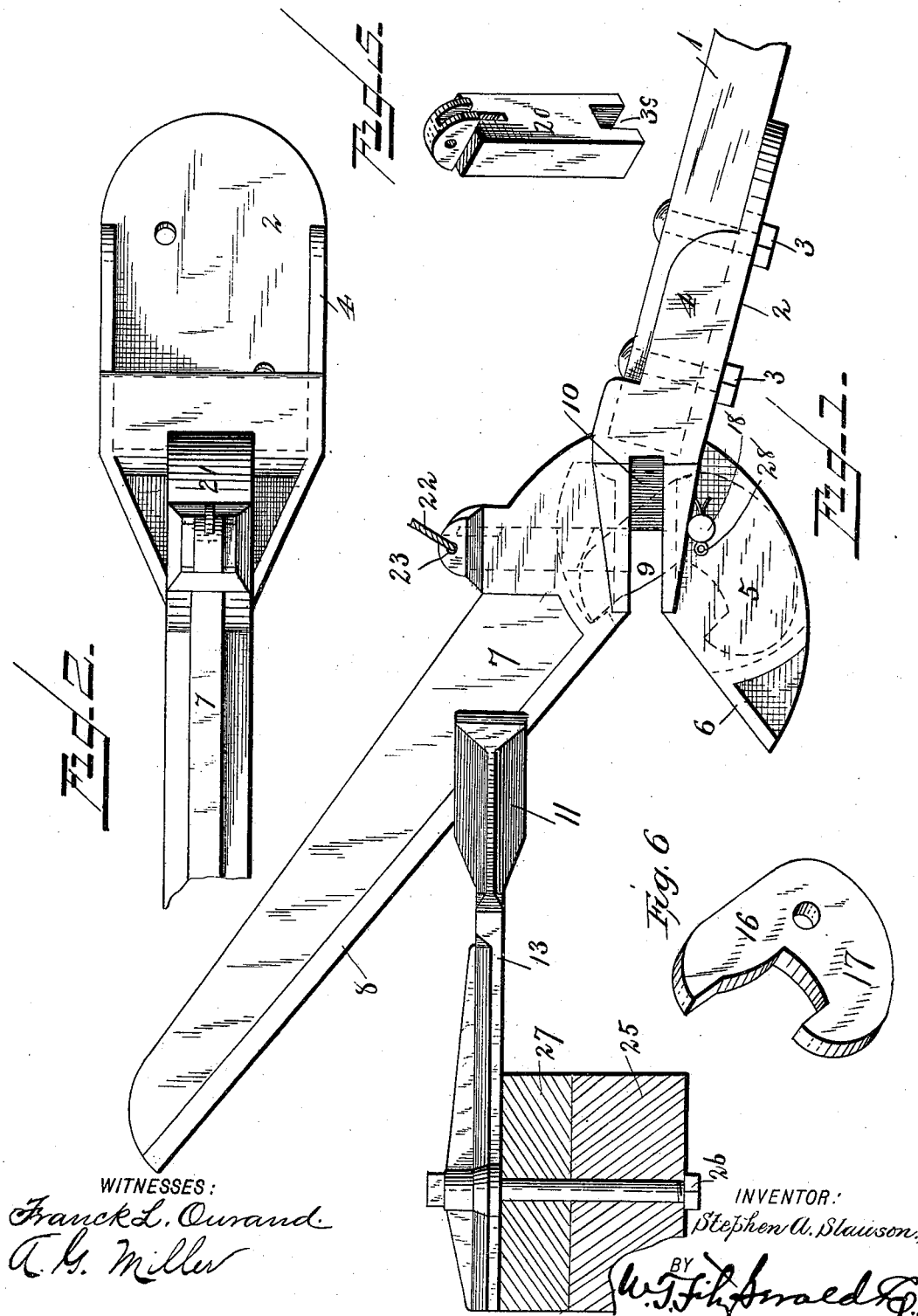
WITNESSES:
Franck L. Ourand
A. G. Miller
INVENTOR:
Stephen A. Slauson,
BY
W. T. Fitzgerald Co.
ATTORNEYS.
THE NORRIS PETERS CO., PHOTO-LITHO., WASHINGTON, D. C.

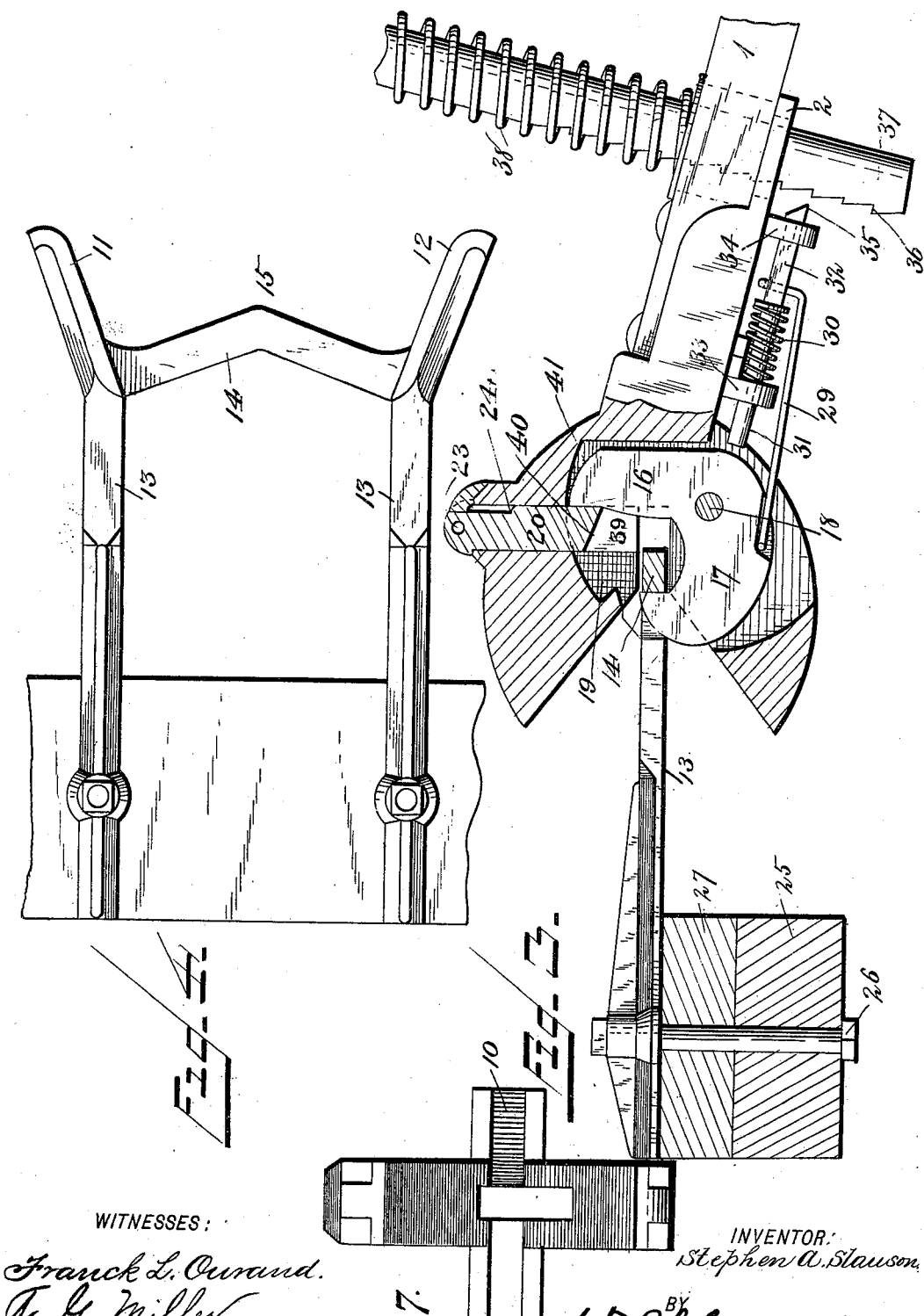

UNITED STATES PATENT OFFICE.

STEPHEN A. SLAUSON, OF CHICAGO, ILLINOIS.

COUPLING FOR HAY-LOADERS.

SPECIFICATION forming part of Letters Patent No. 644,338, dated February 27, 1900.

Application filed October 7, 1899. Serial No. 732,942. (No model.)

*To all whom it may concern:*

Be it known that I, STEPHEN A. SLAUSON, a citizen of the United States, residing at Chicago, in the county of Cook and State of Illinois, have invented certain new and useful Improvements in Couplings for Hay-Loaders; and I do hereby declare the following to be a full, clear, and exact description of the invention, such as will enable others skilled in the art to which it appertains to make and use the same.

My invention relates to a coupling device designed, primarily, for the purpose of coupling a hay-loader to the ordinary hauling-wagon; and it consists of certain novel features of combination and of construction of parts, as will be hereinafter fully described and claimed, reference being had to the accompanying drawings.

It will be understood that a hay-loading machine of the usual or any preferred construction is coupled to the rear end of the hay-wagon in such a way that the hay-loading mechanism will be held in contact with the surface of the ground, and thereby enable the same to take up the hay and elevate it to the top of the wagon, where it is received by the driver and properly placed in position upon the hay-rack. It is therefore obvious that it becomes desirable that the hay-loading mechanism shall be so disposed that it will gather all of the hay or straw without regard to the irregularities of the surface of the soil over which it is drawn. It therefore becomes desirable to provide mechanism in addition to the coupling device which will hold the hay-loading machine proper reliably to its work while passing over rough as well as over a smooth surface.

The prime object, therefore, of my invention is not only to enable the hay-loading mechanism proper to be promptly connected to or disconnected from the hauling-wagon, but that such coupling shall be so effected that the loading mechanism will be held reliably to its work, and thereby enabled to gather all of the hay over which it is drawn.

In the accompanying drawings, Figure 1 is a side view of my improved coupling device and showing a section of the tongue of the hay-loader and a part of the hay-rack between which the coupling device proper is disposed. Fig. 2 is a top plan view thereof, showing the same removed from the tongue of the loader. Fig. 3 is a side view showing another form of my improved coupling device. Fig. 4 is a top plan view of that portion of the coupling device attached to the hay-rack. Fig. 5 is a locking-pin designed to hold the securing device proper in its adjusted position. Fig. 6 is a detail of the securing-hook, while Fig. 7 is an end view of the receiving-jaws shown in Fig. 3.

While I shall illustrate and describe in this application two modifications of my improved coupling device, it will be understood that various other modifications thereof may be employed without departing from the spirit of my invention, and I therefore desire to comprehend in this application the substantial equivalent of the construction presented, inasmuch as various changes may be made in the several parts without materially departing from my ideas.

It will be borne in mind that there are certain varieties of hay-loaders the mechanism of which is held to its work by means of a spring extending from the upper end downward to the tongue, while other varieties of loaders entirely dispense with such device, the tongue being held up by a supporting-leg. My improved coupling device illustrated in Fig. 3 is designed to be used in connection with the former construction, while that form of device illustrated in Figs. 1 and 2 may be satisfactorily employed in connection with the loader having its tongue supported by a leg.

In order to conveniently designate the several parts of my invention and their coöperating accessories, numerals will be employed, of which 1 indicates the end of the tongue of a hay-loader, to which I secure the body portion 2 of my improved coupling device by means of the bolts 3, it being understood that integral side flanges 4 should be provided upon said body portion between which the end of the tongue is more reliably held. The body portion is provided at its forward end with a downwardly-extending jaw 5, having the inclined lip or face 6, while the upper side of said body portion is provided with the upwardly-directed jaw 7, (of longer extent in Fig. 1 than in Fig. 3,) having the inclined face 8, the faces 6 and 8 converging toward each other and terminating in the recess 9, which is tapered laterally and rearwardly to provide the guiding-faces 10, designed to engage one of the branches 11 or 12 of the bracket carried by the hay-rack and comprising the anchoring-sections 13 and the cross-section 14, the latter provided with the central extension 15, designed to act directly upon the upper end 16 of the hook 17, which, as will be seen by reference to Fig. 3, is pivotally mounted upon the bolt 18 within the central vertically-disposed recess 19, provided in the body portion near the point where the jaws 6 and 8 unite therewith. The recess 19 is of sufficient extent to permit the section 16 of the hook 17 to stand in a vertical position in order that it may be secured in a locked position by means of the locking pin or detent 20, which is loosely received in a suitable aperture provided in the enlargement or bracket 21, formed in the base of the jaw 7 upon the upper side of the body portion 2.

The object of the inclined face 8 is to lift the tongue of the hay-loader from the ground, and in so doing it compresses the spring 38, while, on the other hand, should the loader be of that variety having a leg it will raise the leg clear from the ground, inasmuch as such face will receive and guide the cross-section 15 into the seat 9, and thereby bring it into contact with the outer face of the stem 16, causing said stem to move backward into a vertical position and incidentally raising the hook 17 into engagement with said cross-section, and thereby secure the same when the pin 20 has been dropped downward in its seat, thus insuring that the lower end of said pin will engage the upper end of the stem 16 and hold the hook to its work until said pin has been withdrawn, which may readily be done by attaching a cord 22 to the aperture 23.

In order to prevent the entire withdrawal of the pin 20, a suitable shoulder 24 may be formed thereon at a proper point to give said pin the requisite play for disengaging its lower end with the extreme upper end of the stem 16, said shoulder 24 being designed to prevent the entire withdrawal of said pin.

It will be understood that the extent or length of the jaw 7 may be determined by the required distance which the tongue of the loader is to be lifted, it being understood that the object of the block 27 is to dispose the bracket 13 at the same or average height from the ground on all wagons whether high or low. Thus the cross-section 14 will strike the upper jaw in the same place whether on a high or a low wagon and raise the tongue, and thus always give the spring the same tension.

The brackets 13 may be disposed directly upon the end section 25 of the hay-rack and secured thereto by the bolts 26, or a block 27 may be interposed between said brackets and end section, if the wagon is low. If, however, the wagon is of more than the usual height, the section 27 may be disposed upon the under side of the end section 25, thereby disposing the brackets 13 in a lower plane, as will be readily understood.

In order that the hook 17 may be readily removed for the purpose of repair or otherwise, I prefer to hold the bolts 18 in position by the removable keys 28, though other preferred means may be employed.

The form of hook, as illustrated in Fig. 1, being designed especially for use in connection with a hay-loader employing a leg to support the tongue thereof, I will now call attention to another form of construction, (illustrated in Fig. 3,) wherein it will be seen that the hook 17 is normally held downward by means of the rod 29, controlled by the spring 30, which in this instance is coiled around the stem 31 of the bolt 32, which latter is operatively held in position by the brackets 33 and 34, secured to the under side of the body portion 2. The free end of the bolt or detent 32 is provided with the beveled terminal 35, which is designed to engage apertures or teeth 36, formed upon the rod 37, which is the usual means employed in hay-loaders wherein the tongue is supported other than by a leg. It will be seen that the lower end of the rod 37 terminates a short distance below the tongue 1, through which it loosely passes, inasmuch as a suitable aperture is provided therein and in the contiguous body portion 2. The upper end of the rod 37 is connected to the upper part of the loading-frame, and in order to cushion said frame upon the tongue I dispose the spring 38, the upper end of which is connected in any suitable way to said rod, while the lower end bears upon the upper surface of the tongue or upon a washer disposed thereon.

In Fig. 3 I have illustrated the coupling or union as having been made between the section 14 and the coupling proper carried by the tongue 1. This position illustrates the spring 30 having been contracted by the rod 29, one end of which is pivotally connected to the hook 17, while the opposite end is connected in any suitable way, as by means of a slot provided in the bolt 32, and it is obvious that when the retaining-pin 20 is withdrawn from engagement with the stem 16 the hook 17 will be instantly drawn downward by the spring 30, thereby instantly forcing the beveled end 35 into engagement with the contiguous ratchet 36 and incidentally releasing the section 14, and thus uncoupling the loader from the wagon.

Owing to the intimate coöperation of the several parts just described it is obvious that the adjustment of the tension of the spring 38 will not be disturbed by the act of uncoupling, inasmuch as the detent or point 35 will instantly engage the contiguous tooth upon the rod 37, and thus prevent the spring 38 from elevating said rod to an undue extent, it being understood that the prior adjustment of said rod and spring 38 shall be so effected that the lower end of the loading mechanism will be yieldingly held by said spring in engagement with the surface of the ground, thereby insuring that the field will be thoroughly cleaned.

It will be seen that I have provided a very efficient coupling appliance for hay-loaders, by which the same may be readily coupled or uncoupled from the hay-rack of the wagon, thus enabling the operator to instantly drop the tongue of said loader and leave it in the field when he has secured the full load. It is obvious that the same or another wagon may be quickly coupled onto said loader by simply drawing said parts together, when the cross-section 14 will engage the stem 16 of the hook 17 and force said stem backward until the pin 20 automatically drops downward into engagement therewith. As previously explained, the act of uncoupling the parts is readily effected by a slight pull upon the rope 22, which should extend upward to the top of the hay-loader and there secured at a convenient point.

By reference to Fig. 5 it will be observed that the pin or detent 20 is provided with a central recess 39, the upper surface of which is inclined, as indicated by the beveled face 40, the object being to enable the free end of the stem 16 to be received by said recess, and thereby permit the beveled face 40 to ride freely upon the beveled end 41 of the stem 16, and thus prevent the pin from being very greatly withdrawn from its seat in order to lock said stem, and thereby hold the hook 17 in a locked position. In Fig. 1 the hook is held normally downward by its own weight, thus causing said hook to drop out of the way of section 14 the instant the pin 20 is withdrawn.

Believing that the construction and operation of my improved coupling device have been made fully apparent from the foregoing specification, considered in connection with the accompanying drawings, I will dispense with further reference to the details thereof.

What I claim as new, and desire to secure by Letters Patent, is—

1. In a coupling for hay-loaders, &c., a body portion and a pair of jaws secured thereto; a hook mounted within a recess in said jaws; a spring-controlled rod having teeth passing through said body; a spring-controlled bolt normally engaging said teeth and a rod connecting said hook and bolt, all combined as set forth.

2. In a coupling for hay-loaders, the combination with the tongue having a spring-controlled rod, of a pair of open jaws secured to said tongue; a hook mounted in said jaws; a locking-bolt having a spring, said locking-bolt being connected with said hook and designed to hold the same normally open and a detent formed on said bolt adapted to engage said rod and secure the same against movement at the instant said hook is released, as specified and for the purpose set forth.

3. In a coupling for hay-loaders or the like, a body portion having a pair of divergent jaws; a hook coöperating with said jaws; a bolt and means to connect said bolt and hook with each other; a rod passing through said body and provided with a series of teeth or apertures and a spring designed to hold said bolt normally in engagement with said rod and also hold said hook in an open position and a pin adapted to coöperate with said hook and automatically engage and secure it in a closed position until said pin is withdrawn, all combined in the manner specified and for the purpose set forth.

4. The herein-described coupling device for hay-loaders comprising a pair of rigid divergent jaws having guiding-faces; a hook mounted in said jaws; a rod having teeth; a bolt and a spring adapted to hold it against said rod; means to connect said hook with said bolt in combination with a securing-pin having a bifurcated end adapted to straddle the free end of said hook and secure the hook in a closed position until withdrawn substantially as specified and for the purpose set forth.

5. In a coupling for hay-loaders or the like, a body portion and a pair of divergent jaws secured thereto; a hooking member having a hook-section proper 17 and stem 16, operatively mounted in a recess provided near the meeting-point of said jaws, in combination with a locking-pin 20 fitting an aperture in said jaws and having a recess 39 and a beveled face designed to engage the stem 16 and thereby hold the hook in an open position until said pin is withdrawn, all substantially as specified and for the purpose set forth.

In testimony whereof I affix my signature in presence of two witnesses.

STEPHEN A. SLAUSON.

Witnesses:
AUGUST SHAEFER,
ERNST STOCK, Jr.